(12) United States Patent
Liu

(10) Patent No.: US 11,452,057 B2
(45) Date of Patent: Sep. 20, 2022

(54) METHOD AND DEVICE FOR TRANSMITTING SYNCHRONIZATION SIGNAL

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 96 days.

(21) Appl. No.: 17/252,729

(22) PCT Filed: Jun. 21, 2018

(86) PCT No.: PCT/CN2018/092160
§ 371 (c)(1),
(2) Date: Dec. 16, 2020

(87) PCT Pub. No.: WO2019/241951
PCT Pub. Date: Dec. 26, 2019

(65) Prior Publication Data
US 2021/0219252 A1    Jul. 15, 2021

(51) Int. Cl.
*H04W 56/00* (2009.01)
*H04W 24/08* (2009.01)
*H04W 72/04* (2009.01)

(52) U.S. Cl.
CPC ......... *H04W 56/001* (2013.01); *H04W 24/08* (2013.01); *H04W 72/0446* (2013.01); *H04W 72/0453* (2013.01)

(58) Field of Classification Search
CPC ............... H04W 56/001; H04W 24/08; H04W 72/0446; H04W 72/0453; H04W 4/06
See application file for complete search history.

(56) References Cited

U.S. PATENT DOCUMENTS

2019/0110267 A1* 4/2019 Ko ................. H04L 5/0053
2019/0174466 A1* 6/2019 Zhang .............. H04L 5/0057
(Continued)

FOREIGN PATENT DOCUMENTS

CN          106304094 A       1/2017

OTHER PUBLICATIONS

R1-1803978 "Discussion on SS/PBCH block waveform for NR-U"; OPPO; GPP TSG RAN WG1 Meeting #92bis R1-1803978 Sanya, China, Apr. 16-20, 2018 (Year: 2018).*
(Continued)

*Primary Examiner* — Benjamin H Elliott, IV
(74) *Attorney, Agent, or Firm* — Syncoda LLC; Feng Ma

(57) ABSTRACT

A method and device for transmitting a synchronization signal includes: performing channel detection on time-frequency resources corresponding to a synchronous broadcast block of a base group to be sent and a synchronous broadcast block of an extended group, respectively, so as to detect whether the time-frequency resource is idle, wherein the base group and the extended group include synchronous broadcast blocks of the same serial number; the synchronous broadcast block of the base group of the same sequence number and the synchronous broadcast block of the extended group correspond to different time-frequency resources; transmitting an information block on the time-frequency resource when the time-frequency resource corresponding to the at least one synchronous broadcast block in the base group and the extended group is idle, the information block including the at least one synchronous broadcast block.

20 Claims, 11 Drawing Sheets

(56) References Cited

U.S. PATENT DOCUMENTS

| | | | |
|---|---|---|---|
| 2020/0068514 A1* | 2/2020 | Liu | H04W 72/044 |
| 2020/0077353 A1* | 3/2020 | Liu | H04W 72/0466 |
| 2020/0154376 A1* | 5/2020 | Ko | H04L 5/0044 |
| 2020/0163054 A1* | 5/2020 | Liu | H04L 5/0053 |
| 2020/0344705 A1* | 10/2020 | Tang | H04W 72/0446 |
| 2020/0344815 A1* | 10/2020 | Svedman | H04W 56/001 |
| 2020/0413356 A1* | 12/2020 | Wang | H04W 56/001 |
| 2021/0007065 A1* | 1/2021 | Ko | H04W 76/11 |
| 2021/0084687 A1* | 3/2021 | Liu | H04W 72/0446 |
| 2021/0153107 A1* | 5/2021 | Xu | H04W 56/001 |
| 2021/0167940 A1* | 6/2021 | Islam | H04L 5/0048 |
| 2021/0219252 A1* | 7/2021 | Liu | H04W 72/0453 |

OTHER PUBLICATIONS

R1-1806410 "Discussion on SS/PBCH block in NR-U operation"; Spreadtrum Communications; 3GPP TSG RAN WG1 Meeting #93 R1-1806410 Busan, Korea, May 21-25, 2018 (Year: 2018).*

R1-1806856 "SS/PBCH block transmission on NR-U"; OPPO; GPP TSG RAN WG1 Meeting #93 R1-1806856 Busan, Korea, May 21-25, 2018 (Year: 2018).*

R1-1807208 "SS/PBCH blocks transmission for NR unlicensed"; Xiaomi Communications; 3GPP TSG RAN WG1 Meeting #93 R1-1807208 Busan, Korea, May 21-25, 2018 (Year: 2018).*

R1-1807225 "Design Considerations for SSB in NR-U"; Convida Wireless; 3GPP TSG-RAN WG1 Meeting #93 R1-1807225 Busan, Korea, May 21-25, 2018 (Year: 2018).*

R1-1907462 "[Draft] LS to RAN4 on SS/PBCH Block SCS and time domain pattern for 5 and 6 GHz bands"; Ericsson; 3GPP TSG-RAN WG1 Meeting #97 R1-1907462 Reno, NV, USA, May 13-17, 2019 (Year: 2019).*

WIPO International Search Report PCT/CN2018/092160, English Translation; Mar. 19, 2019; retrieved from the Internet on May 16, 2022 (Year: 2019).*

International Search Report in PCT/CN2018/092160 dated Mar. 14, 2019.

* cited by examiner

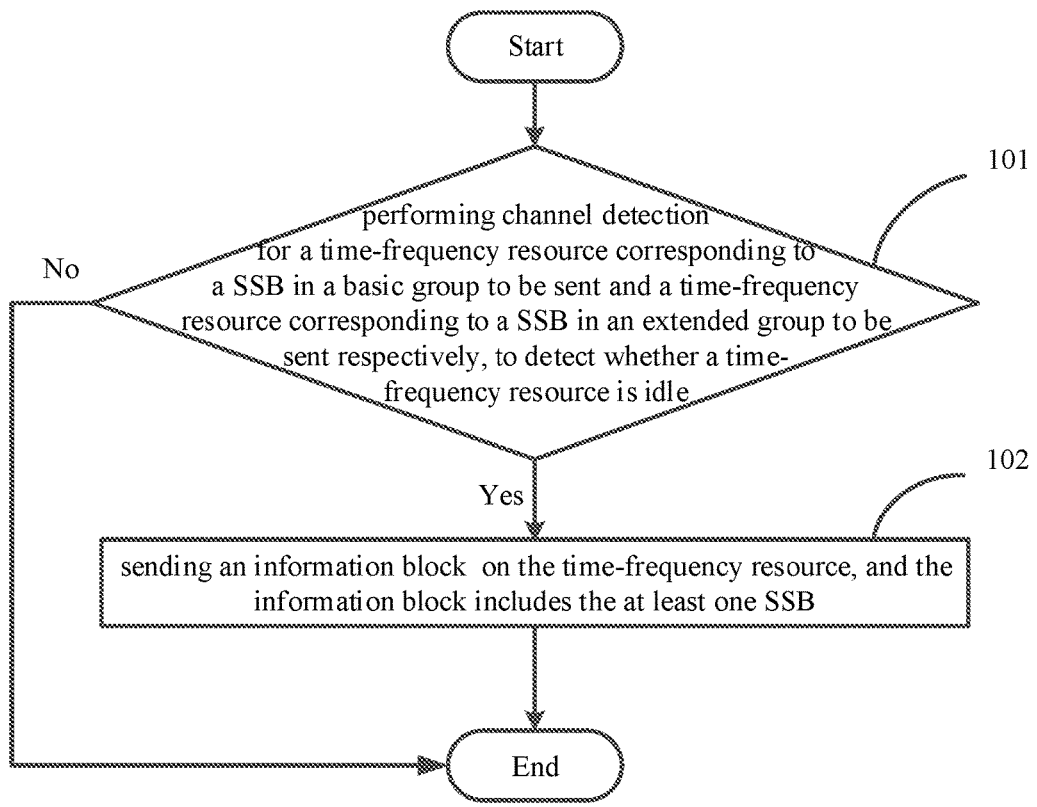

METHOD AND DEVICE FOR TRANSMITTING SYNCHRONIZATION SIGNAL

CROSS-REFERENCE TO RELATED APPLICATIONS

The present application is a national stage of International Application No. PCT/CN2018/092160 filed on Jun. 21, 2018, the disclosure of which is hereby incorporated by reference in its entirety.

FIELD

The present disclosure relates to the field of communication technology, and more particularly, to a method and a device for transmitting a synchronization signal.

BACKGROUND

In the related art, a research project has recently been conducted on the unlicensed spectrum in 5G (5th generation communication system), and a plan is proposed to support the stand alone networking of unlicensed cells in 5G. In the 5G unlicensed spectrum standalone networking design, the first step is to consider the design of a synchronous broadcast block (SS/PBCH BLOCK, hereinafter abbreviated as SSB). However, there is currently no effective solution in the art.

SUMMARY

Embodiments of the present disclosure provide a method and a device for transmitting a synchronization signal. The technical solutions are as follows.

According to a first aspect of embodiments of the present disclosure, a method for transmitting a synchronization signal is provided, including: performing channel detection for a time-frequency resource corresponding to a synchronous broadcast block (SSB) in a basic group to be sent and a time-frequency resource corresponding to a SSB in an extended group to be sent respectively, to detect whether a time-frequency resource is idle, wherein each of the basic group and the extended group includes a SSB with a same sequence number; the SSB with the same sequence number in the basic group and the SSB with the same sequence number in the extended group correspond to different time-frequency resources; when a time-frequency resource corresponding to at least one SSB in the basic group and the extended group is idle, transmitting an information block on the time-frequency resource, the information block including the at least one SSB.

The technical solution provided by the embodiment of the present disclosure may include the following beneficial effects: the SSB with the same sequence number are sent repeatedly, the UE has one more chance to receive the SSB, which facilitate the UE to complete the synchronization process in a timely manner.

In an embodiment, the time-frequency resource corresponding to the SSB with the same sequence number in the basic group and the time-frequency resource corresponding to the SSB with the same sequence number in the extended group are not continuous in a time domain, and correspond to different carrier units in a frequency domain.

The technical solution provided by the embodiment of the present disclosure may include the following beneficial effects: a plurality of SSBs with the same sequence number are transmitted on different carrier units, and they are not continuously transmitted in the time domain, which facilitate a single-carrier UE operated on different carrier units to perform synchronization processing and a multiple-carrier UE to have more chance of receiving the SSB, and the synchronization process may be performed in a timely manner.

In an embodiment, the time-frequency resource corresponding to the SSB with the same sequence number in the extended group and the time-frequency resource corresponding to the SSB with the same sequence number in the basic group are the same in a time domain, and correspond to different carrier units in a frequency domain.

The technical solution provided by the embodiment of the present disclosure may include the following beneficial effects: a time-frequency resource corresponding to a SSB in the extended group and a time-frequency resource corresponding to a SSB in the basic group with a different sequence number are the same in the time domain and correspond to different carrier units in the frequency domain. It is more convenient for the UE to receive the SSB, and synchronization process may be performed in a timely manner.

In an embodiment, the information block further includes offset indication information used to indicate an offset of the time-frequency resource corresponding to the SSB with the same sequence number in the extended group relative to the time-frequency resource corresponding to the SSB with the same sequence number in the basic group.

The technical solution provided by the embodiment of the present disclosure may include the following beneficial effects: the base station can issue offset indication information to notify the UE of the time-frequency resource corresponding to the SSB in the extended group, so that the UE can easily receive.

In an embodiment, the offset indication information includes time domain offset indication information, or includes time domain offset indication information and frequency domain offset indication information.

The technical solution provided by the embodiment of the present disclosure may include the following beneficial effects: a plurality of offset indication methods are provided, which are suitable for multiple application scenarios.

In an embodiment, the SSB in the extended group includes a mark identifying the extended group.

The technical solution provided by the embodiment of the present disclosure may include the following beneficial effects: a mark is used to notify the UE of whether the current SSB is in the basic group or the extended group.

According to a second aspect of embodiments of the present disclosure, a method for transmitting a synchronization signal is applied to a user equipment (UE) side and includes: receiving an information block including a SSB; determining whether the SSB belongs to a basic group or an extended group, wherein each of the basic group and the extended group includes a SSB with a same sequence number; the SSB with the same sequence number in the basic group and the SSB with the same sequence number in the extended group correspond to different time-frequency resources; performing synchronization process according to the group to which the SSB belongs.

The technical solution provided by the embodiment of the present disclosure may include the following beneficial effects: the UE can perform synchronization processing according to the SSB in the basic group or the extended group, which increases the chances for synchronization process and makes synchronization timely In an embodiment, the information block further includes offset indication information used to indicate an offset of the time-frequency resource corresponding to the SSB with the same sequence number in the extended group relative to the time-frequency resource corresponding to the SSB with the same sequence number in the basic group.

The method further includes: when it is determined that the SSB belongs to the extended group, determining time-frequency resource corresponding to the received SSB according to the time-frequency resource corresponding to the SSB with the same sequence number in the basic group and the offset indication information.

The technical solution provided by the embodiment of the present disclosure may include the following beneficial effects: the UE can monitor and receive SSBs according to different offset indication information.

In an embodiment, the offset indication information comprises time domain offset indication information; the determining time-frequency resource corresponding to the received SSB according to the time-frequency resource corresponding to the SSB with the same sequence number in the basic group and the offset indication information includes: determining the time-frequency resource corresponding to the received SSB according to the time-frequency resource corresponding to the SSB with the same sequence number in the basic group and the time-domain offset indication information; or the offset indication information includes time domain offset indication information and frequency domain offset indication information; the determining time-frequency resource corresponding to the received SSB according to the time-frequency resource corresponding to the SSB with the same sequence number in the basic group and the offset indication information includes: determining the time-frequency resource corresponding to the received SSB according to the time-frequency resource corresponding to the SSB with the same sequence number in the basic group, the time-domain offset indication information and frequency-domain offset indication information.

The technical solution provided by the embodiment of the present disclosure may include the following beneficial effects: different processing methods can be performed according to different offset indication information, and the monitoring of SSB in the basic group can be realized.

In an embodiment, a time-frequency resource corresponding to a SSB in the extended group and a time-frequency resource corresponding to a SSB with a different sequence number in the basic group are the same in the time domain, and correspond to different carrier units in the frequency domain; before the receiving the information block, the method further including: monitoring a plurality of carrier units in the time domain corresponding to the SSB in the basic group.

The technical solution provided by the embodiment of the present disclosure may include the following beneficial effects: the SSBs in the basic group and the extended group can be monitored in the time domain corresponding to the SSB in the basic group.

In an embodiment, the SSB in the extended group includes a mark identifying the extended group; the determining whether the SSB belongs to a basic group or an extended group includes: determining whether the SSB belongs to the basic group or the extended group according to whether the SSB includes the mark.

The technical solution provided by the embodiment of the present disclosure may include the following beneficial effects: it is possible to determine whether the SSB belongs to the basic group or the extended group according to the mark, so as to perform synchronization process.

According to a third aspect of embodiments of the present disclosure, a device for transmitting a synchronization signal is applied to a base station and includes: a detection module, configured to perform channel detection for a time-frequency resource corresponding to a synchronous broadcast block (SSB) in a basic group to be sent and a time-frequency resource corresponding to a SSB in an extended group to be sent respectively, to detect whether a time-frequency resource is idle, wherein each of the basic group and the extended group includes a SSB with a same sequence number; the SSB with the same sequence number in the basic group and the SSB with the same sequence number in the extended group correspond to different time-frequency resources; a transmitting module, configured to, when a time-frequency resource corresponding to at least one SSB in the basic group and the extended group is idle, transmit an information block on the time-frequency resource, the information block including the at least one SSB.

In an embodiment, the time-frequency resource corresponding to the SSB with the same sequence number in the basic group and the time-frequency resource corresponding to the SSB with the same sequence number in the extended group are not continuous in a time domain, and correspond to different carrier units in a frequency domain.

In an embodiment, the time-frequency resource corresponding to the SSB with the same sequence number in the extended group and the time-frequency resource corresponding to the SSB with the same sequence number in the basic group are the same in a time domain, and correspond to different carrier units in a frequency domain.

In an embodiment, the information block further includes offset indication information used to indicate an offset of the time-frequency resource corresponding to the SSB with the same sequence number in the extended group relative to the time-frequency resource corresponding to the SSB with the same sequence number in the basic group.

In an embodiment, the offset indication information includes time domain offset indication information, or includes time domain offset indication information and frequency domain offset indication information.

In an embodiment, the SSB in the extended group includes a mark identifying the extended group.

According to a fourth aspect of embodiments of the present disclosure, a device for transmitting a synchronization signal is applied to a UE and includes: a receiving module, is configured to receive an information block including a SSB; a first determining module, configured to determine whether the SSB belongs to a basic group or an extended group, wherein each of the basic group and the extended group includes a SSB with a same sequence number; the SSB with the same sequence number in the basic group and the SSB with the same sequence number in the extended group correspond to different time-frequency resources; and a synchronization module, configured to perform synchronization process according to the group to which the SSB belongs.

In an embodiment, the information block further includes offset indication information used to indicate an offset of the time-frequency resource corresponding to the SSB with the same sequence number in the extended group relative to the time-frequency resource corresponding to the SSB with the same sequence number in the basic group, the device further includes a second determining module, the second determining module is configured to, when it is determined that the SSB belongs to the extended group, determine time-frequency resource corresponding to the received SSB according to the time-frequency resource corresponding to the SSB with the same sequence number in the basic group and the offset indication information.

In an embodiment, the offset indication information comprises time domain offset indication information; the second determining module includes: a first determining sub-module, configured to determine the time-frequency resource corresponding to the received SSB according to the time-frequency resource corresponding to the SSB with the same sequence number in the basic group and the time-domain offset indication information, or the offset indication information includes time domain offset indication information and frequency domain offset indication information; the second determining module includes: a second determining sub-module, configured to determine the time-frequency resource corresponding to the received SSB according to the time-frequency resource corresponding to the SSB with the same sequence number in the basic group, the time-domain offset indication information and frequency-domain offset indication information.

In an embodiment, a time-frequency resource corresponding to a SSB in the extended group and a time-frequency resource corresponding to a SSB with a different sequence number in the basic group are the same in the time domain, and correspond to different carrier units in the frequency domain; before the receiving the information block, the device further includes: a monitoring module, configured to monitor a plurality of carrier units in the time domain corresponding to the SSB in the basic group.

In an embodiment, the SSB in the extended group includes a mark identifying the extended group; the first determining module includes: a third determining sub-module, configured to determine whether the SSB belongs to the basic group or the extended group according to whether the SSB includes the mark.

According to a fifth aspect of embodiments of the present disclosure, a device for transmitting a synchronization signal includes: a processor; and a memory configured to store instructions executable by the processor, in which, the processor is configured to: perform channel detection for a time-frequency resource corresponding to a synchronous broadcast block (SSB) in a basic group to be sent and a time-frequency resource corresponding to a SSB in an extended group to be sent respectively, to detect whether a time-frequency resource is idle, wherein each of the basic group and the extended group includes a SSB with a same sequence number; the SSB with the same sequence number in the basic group and the SSB with the same sequence number in the extended group correspond to different time-frequency resources; when a time-frequency resource corresponding to at least one SSB in the basic group and the extended group is idle, transmitting an information block on the time-frequency resource, the information block including the at least one SSB.

According to a sixth aspect of embodiments of the present disclosure, a device for transmitting a synchronization signal, includes: a processor; and a memory configured to store instructions executable by the processor, in which the processor is configured to: receive an information block, which includes a SSB; determine whether the SSB belongs to a basic group or an extended group; in which the basic group and the extended group include SSBs with the same sequence number; a SSB with the same sequence number in the basic group and a SSB with the same sequence number in the extended group correspond to different time-frequency resources; perform synchronization process according to the group to which the SSB belongs.

According to a seventh aspect of embodiments of the present disclosure, a non-transitory computer-readable, having stored therein instructions that, when executed by a processor to perform the method for transmitting a synchronization signal.

According to a second aspect of embodiments of the present disclosure, a non-transitory computer-readable, having stored therein instructions that, when executed by a processor to perform the method for transmitting a synchronization signal.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate embodiments consistent with the disclosure and, together with the description, serve to explain the principles of the disclosure.

FIG. 1 is a flowchart showing a method for transmitting a synchronization signal according to an embodiment of the present disclosure.

FIG. 2 is a schematic diagram showing a synchronous broadcast block according to an embodiment of the present disclosure.

FIG. 3 is a schematic diagram showing a synchronous broadcast block according to an embodiment of the present disclosure.

DETAILED DESCRIPTION

Figures 4, 5:
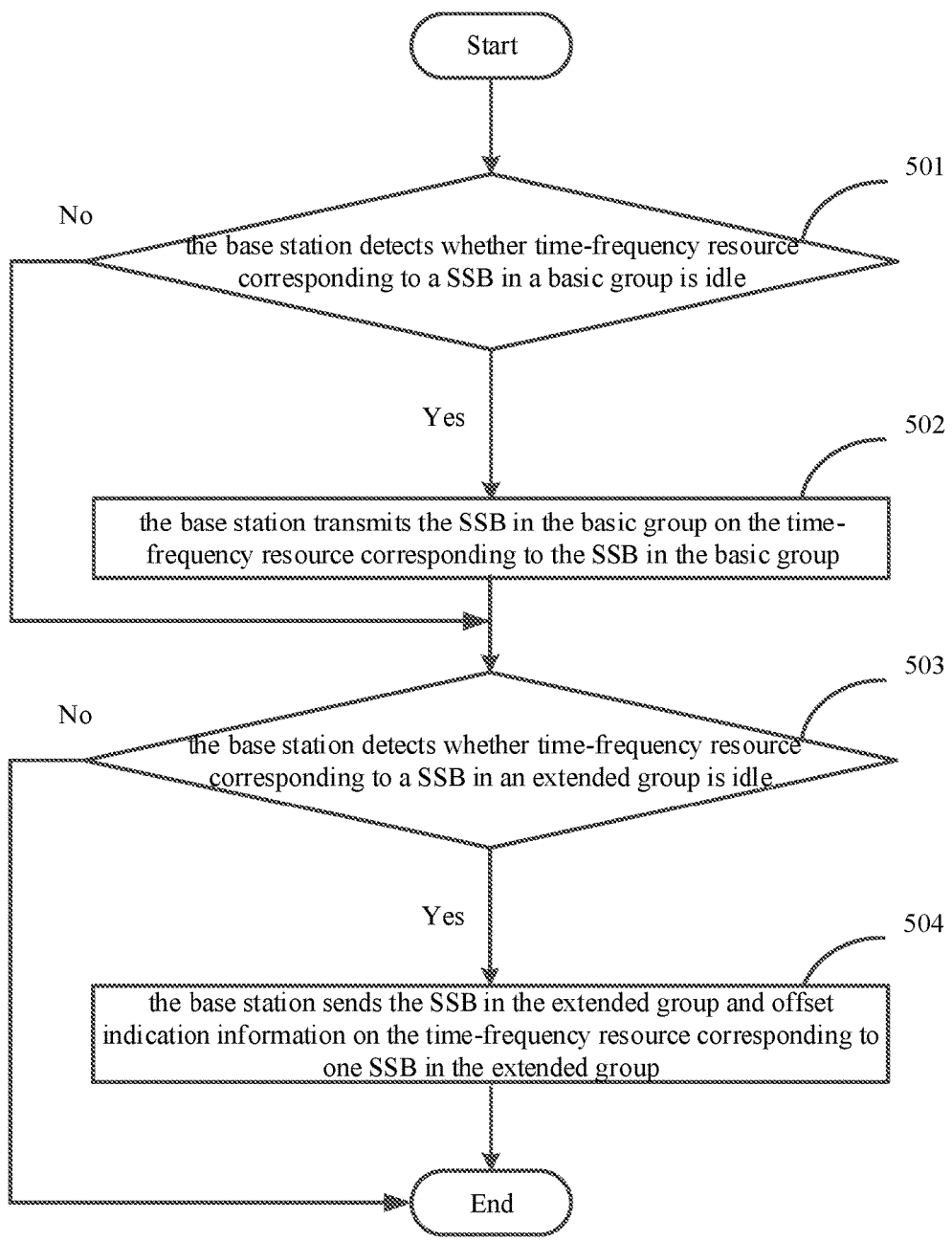
FIG. 4 is a schematic diagram showing a synchronous broadcast block according to an embodiment of the present disclosure.
FIG. 5 is a flowchart showing a method for transmitting a synchronization signal according to an embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

In the related art, in the 5G unlicensed spectrum system, the system specifies the maximum number of SSBs (such as 4) that can be transmitted in a transmission period (such as 14 time domain symbols). A base station can determine the number of actually transmitted SSBs (such as 1 or 2) according to the actual situation. The number of actually transmitted SSBs may be relatively small, and these SSBs may also be transmitted in one beam. If a user equipment (UE) misses the beam, synchronization processing cannot be completed within the transmission period, resulting in a large delay. Or, if the time-frequency resource of the SSB is occupied so that the base station abandons transmitting the SSB, the UE may not be able to complete the synchronization processing in time, resulting in a large delay.

To solve the above problem, in this embodiment, SSBs having the same sequence number are sent several times, the number of times that SSBs are sent is increased, that is, the UE increases the chance of receiving SSBs, which facilitates the UE to complete synchronization in a more timely manner and reduce the delay.

FIG. 1 is a flowchart showing a method for transmitting a synchronization signal according to an embodiment of the present disclosure. The method for transmitting a synchronization signal is used in an access network device such as a base station. As shown in FIG. 1, the method includes the following steps 101-102.

In step 101, channel detection is performed for a time-frequency resource corresponding to a synchronous broadcast block (SSB) in a basic group to be sent and a time-frequency resource corresponding to a SSB in an extended group to be sent respectively, to detect whether a time-frequency resource is idle, in which each of the basic group and the extended group includes a SSB with a same sequence number; the SSB with the same sequence number in the basic group and the SSB with the same sequence number in the extended group correspond to different time-frequency resources.

In step 102, when a time-frequency resource corresponding to at least one SSB in the basic group and the extended group is idle, an information block is sent on the time-frequency resource, and the information block including the at least one SSB.

In this embodiment, for the convenience of description and to reflect that the SSBs of the same sequence number can be repeatedly sent, the SSBs are divided into SSBs in the basic group and SSBs in the extended group. The SSB specified by the 5G system in the related art is called the SSBs in the basic group. SSBs that are additionally repeatedly sent in this embodiment is called the SSBs in the extended group. Therefore, the SSBs in the basic group and the SSBs in the extended group include SSBs of the same sequence number. That is, one SSB can be sent once on the time-frequency resource of the basic group, and can also be sent once again on the time-frequency resource of the extended group, which realizes repeated transmission. Of course, there can be a plurality of extended groups, that is, SSBs with the same sequence number can be repeatedly sent a plurality of times.

The system predefines the maximum number of SSBs included in a basic group, how many SSBs are actually sent, and which SSBs are sent, which are determined by the base station according to the actual situation. The extended group and the basic group include SSBs of the same sequence number. That is, when the base station determines which SSBs are to be sent by the basic group, it is equivalent to simultaneously determine which SSBs are to be sent by the extended group. For example, the basic group will send SSB0 and SSB2. Then the extended group will also send SSB0 and SSB2.

A basic group corresponds to a group of time domain symbols. That means the basic group is repeated with the group of time domain symbols as a transmission period. The group of time domain symbols may include time domain symbols whose number is specified by the system, such as 28 time domain symbols, or time domain symbols included in a time slot.

The time-frequency resources in this embodiment include time domain resources and frequency domain resources. The SSBs in the basic group and the SSBs in the extended group of the same sequence number correspond to different time-frequency resources, that is time domain resources are different or the frequency domain resources are different. Both of them can be considered as different time-frequency resources.

For example, as shown in FIG. 2, taking the basic group and the extended group corresponding to different time domain resources as an example, the base station determines to send SSB0 in the basic group on the time domain symbol S2, send SSB2 in the basic group on S16, and send SSB0 in the extended group on S8, send SSB2 in the extended group on S22. One SSB can occupy 2 or 4 time domain symbols. The basic group and the extended group can correspond to the same carrier. The base station detects whether the time-frequency resource on S2 is idle, and if yes, it sends SSB0 in the basic group. Then the base station detects whether the time-frequency resource on S8 is idle, and if yes, it sends SSB0 in the extended group, and so on. If it is not idle, the base station abandons sending. It can be seen that both SSB0 and SSB2 have at least two chances to send. Even if the sending cannot be implemented because time-frequency resources are occupied, there is still another chance to send. If both SSB0 and SSB2 can be sent at least twice, even if the UE misses one chance for receiving SSB0 or SSB2 once, it still has another chance for receiving.

For another example, as shown in FIG. 3, taking the basic group and the extended group corresponding to different frequency domain resources as an example, the base station determines to send SSB0 in the basic group on carrier 1 of the time domain symbol S2, and send SSB2 in the basic group on carrier 1 of S8, send SSB0 in the extended group on carrier 2 of S2, and send SSB2 in the extended group on carrier 2 of S8. One SSB can occupy 2 or 4 time domain symbols. The basic group and the extended group can correspond to the same time slot. The base station detects whether the time-frequency resource on carrier 1 of S2 is idle, and if yes, it sends SSB0 in the basic group. And the base station detects whether the time-frequency resource on carrier 2 of S2 is idle, and if yes, the base station sends SSB0 in the extended group, and so on. If it is not idle, the base station abandons sending. It can be seen that both SSB0 and SSB2 have at least two chances for sending. For single-carrier UEs operated on carrier 1 and carrier 2, both of them have the chance to receive SSB0 and SSB2, which facilitates the single-carrier UEs operated on different carriers to implement synchronization process. For a multi-carrier UE operated on carrier 1 and carrier 2, there are at least two chances for receiving SSB0 and SSB2, the synchronization process may be implemented in a timely manner.

In one embodiment, the time-frequency resource corresponding to the SSB with the same sequence number in the basic group and the time-frequency resource corresponding to the SSB with the same sequence number in the extended group are not continuous in the time domain, and correspond to different carrier units in the frequency domain.

This embodiment is obtained by combining the embodiments of FIG. 2 and FIG. 3, that is, the corresponding resource in the basic group and in the extended group are different both in the time domain and in the frequency domain, and may also be discontinuous in both the time domain and the frequency domain.

For example, as shown in FIG. 4, the base station determines to send SSB0 in the basic group on carrier 1 of the time domain symbol S2, send SSB2 in the basic group on carrier 1 of S16, and send SSB0 in the extended group on carrier 2 of S8, and send SSB2 in the extended group on carrier 2 of S22. One SSB can occupy 2 or 4 time domain symbols. The base station detects whether the time-frequency resource on carrier 1 of S2 is idle, and if yes, it sends SSB0 in the basic group. Then the base station detects whether the time-frequency resource on carrier 2 of S8 is idle, and if yes, it sends SSB0 in the extended group, and so on. If it is not idle, the base station abandons sending. It can be seen that both SSB0 and SSB2 have at least two chances for sending. For single-carrier UEs operated on carrier 1 and carrier 2, both of them have the chance to receive SSB0 and SSB2, which facilitates the single-carrier UEs operated on different carriers to implement synchronization process. For a multi-carrier UE operated on carrier 1 and carrier 2, there are at least two chances for receiving SSB0 and SSB2, the synchronization process may be implemented in a timely manner.

In an embodiment, a time-frequency resource corresponding to a SSB in the extended group and a time-frequency resource corresponding to a SSB with a different sequence number in the basic group are the same in the time domain, and correspond to different carrier units in the frequency domain.

For example, the base station determines to send SSB0 in the basic group on carrier 1 of the time domain symbol S2, send SSB2 in the basic group on carrier 1 of S16, send SSB0 in the extended group on carrier 2 of S8, and send SSB2 in the extended group on carrier 2 of S22. At the same time, S8 is the time domain symbol corresponding to SSB1 in the basic group, and the time-frequency resource corresponding to SSB1 is carrier 1 of S8, but this time the base station does not decide to send SSB1 in the basic group. Of course, the base station can also decide to send SSB1 in the basic group. Similarly, S22 is the time domain symbol corresponding to SSB3 in the basic group, and the time-frequency resource corresponding to SSB3 is carrier 1 of S22.

The base station knows the time domain symbols corresponding to each SSB in the basic group, and configures the SSB in the extended group to the time domain symbols of the basic group. For the base station, the time-frequency resource allocation strategy is not changed much, and the compatibility is better. There is less impact on the time-frequency resource configuration of other downlink information. On the other hand, this can also facilitate the UE to implement the synchronization process. The UE knows the time domain symbol corresponding to each SSB in the basic group in advance. When the UE has received the SSB in the basic group, it parses out the sequence number of the SSB, and determines the corresponding time-domain symbol according to a first correspondence relationship between the sequence number of the SSB and the time domain symbol (a corresponding carrier unit may be further included), and then the synchronization process is implemented. If a second correspondence relationship between the sequence number of the SSB in the extension group and the time-domain symbol (a corresponding carrier unit may be further included) is pre-configured, and the base station and the UE both know the second correspondence relationship in advance, the UE can implement the synchronization process according to the sequence number of the SSB in the extension group. The SSB in the extended group is configured to the time domain symbol of the basic group, the second correspondence relationship may be simplified, or in other words, the first correspondence relationship and the second correspondence relationship may be combined and expressed.

The system may also configure the above-mentioned first correspondence relationship and second correspondence relationship in advance, so that the base station sends the SSBs in the basic group and the extended group on a fixed time domain symbol, which facilitates the UE to implement the synchronization process. There may also be another implementation in which the base station flexibly configures the time-frequency resource of the SSB in the extended group, which will be described in the following embodiments.

In one embodiment, the information block further includes offset indication information, which is used to indicate an offset of the time-frequency resource corresponding to the SSB with the same sequence number in the extended group relative to the time-frequency resource corresponding to the SSB with the same sequence number in the basic group.

In this embodiment, the base station can flexibly configure time-frequency resource for the SSB in the extended group. When the time-frequency resource is idle, the base station sends the SSB in the extended group on the time-frequency resource, and notifies the UE the offset of the time-frequency resource of the SSB in the extended group relative to the time-frequency resource of the SSB in the basic group, in which the SSB in the extended group and the SSB in the basic group have the same sequence number, through the offset indication information in the information block. The offset indication information can be sent through Physical Downlink Channel (PDCH).

In an embodiment, the offset indication information includes time domain offset indication information, or includes time domain offset indication information and frequency domain offset indication information.

For example, the information block only includes time domain offset indication information. For example, if the time domain offset indication information is 0, the SSBs having the same sequence number in the basic group and in the extended group are on different carriers of the same time domain symbol. For example, the time domain offset indication information is 6, which means 6 time domain symbols. SSB0 in the basic group corresponds to the time domain symbol S2, and SSB0 in the extended group corresponds to the time domain symbol S8, which is offset by 6 time domain symbols.

For another example, the information block includes time domain offset indication information and frequency domain offset indication information. For example, the time domain offset indication information is 6 and the frequency domain offset indication information is 1, and SSB0 in the basic group corresponds to carrier 1 on the time domain symbol S2, SSB0 in the extended group corresponds to carrier 2 on the time domain symbol S8, which is offset by 6 symbols in the time domain and offset by 1 carrier unit in the frequency domain.

The base station may carry the offset indication information in the information block including SSBs in the basic group, and may also carry the offset indication information in the information block including SSBs in the extended group; or carry the offset indication only in the information block including SSBs in the extended group, which facilitates the UE to implement the synchronization process. The base station can flexibly configure the time-frequency resources of SSBs in the extended group, and notify the UE through the offset indication information.

In one embodiment, the SSB in the extended group includes a mark identifying the extended group.

For example, a SSB in the extended group is represented as SSB0-1, in which 0 is the sequence number of the SSB, and "−1" identifies the first extended group. The UE can distinguish the basic group and the extended group through this mark, and implements the synchronization process in a better manner.

The implementation process on the base station side is described in detail below through embodiments.

FIG. 5 is a flowchart showing a method for transmitting a synchronization signal according to an embodiment. The method for transmitting synchronization signals is used in an access network device, such as a base station. As shown in FIG. 5, the method includes the following steps 501-504.

In step 501, the base station detects whether time-frequency resource corresponding to a SSB in a basic group is idle; when it is idle, proceed to step 502, and when it is not idle, proceed to step 503.

In step 502, the base station transmits the SSB in the basic group on the time-frequency resource corresponding to the SSB in the basic group.

In step 503, the base station detects whether time-frequency resource corresponding to a SSB in an extended group is idle; when it is idle, proceed to step 504, and when it is not idle, this process is end.

The SSB in step 503 has the same sequence number as the SSB in step 501.

In step 504, the base station sends the SSB in the extended group and offset indication information on the time-frequency resource corresponding to one SSB in the extended group.

The above process can be repeated to realize the transmission of other SSBs in the basic group and the extended group.

The above describes the implementation on the base station side, and correspondingly, there are improvements on the UE side. The implementation on the UE side is introduced below.

Figure 6:
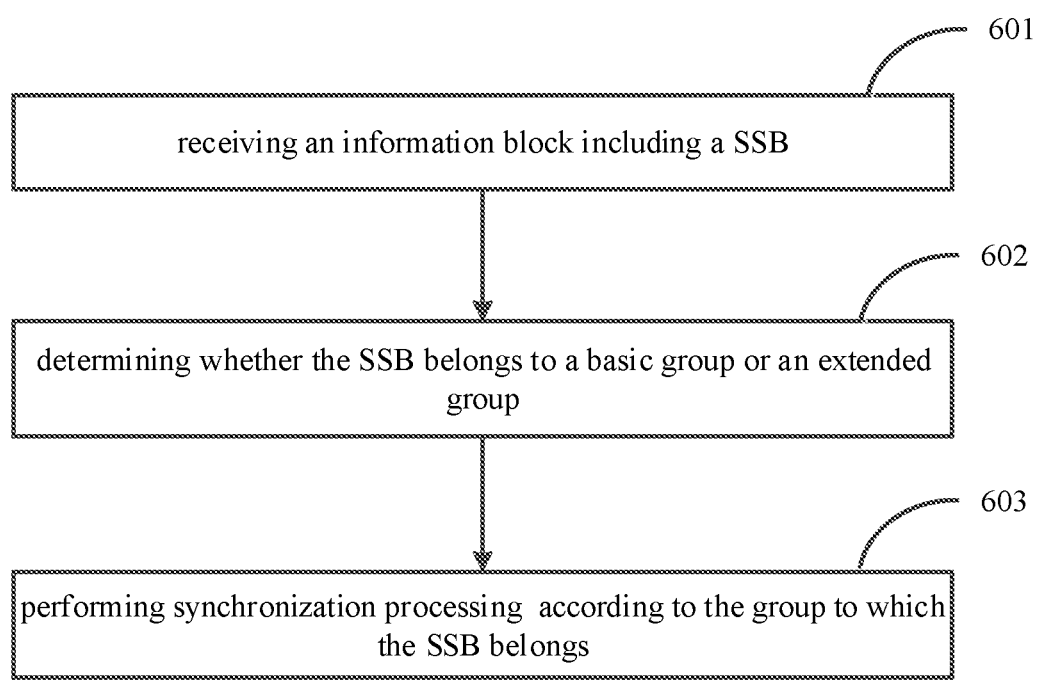
FIG. 6 is a flowchart showing a method for transmitting a synchronization signal according to an embodiment of the present disclosure.

FIG. 6 is a flowchart showing a method for transmitting a synchronization signal according to an embodiment. The method for transmitting a synchronization signal is used in a terminal, in which the terminal may be a mobile phone, a computer, a digital broadcasting terminal, a message transmission device, a game console, a tablet device, a medical equipment, a fitness equipment, a personal digital assistant, etc. As shown in FIG. 6, the method includes the following steps 601-603.

In step 601, an information block is received, which includes a SSB.

In step 602, it is determined whether the SSB belongs to a basic group or an extended group; in which the basic group and the extended group include SSBs with a same sequence number; the SSBs in the basic group and in the extended group that have the same sequence number correspond to different time-frequency resources.

In step 603, synchronization processing is performed according to the group to which the SSB belongs.

The UE receives a SSB, and the SSB may belong to a basic group or an extended group. When the SSB belongs to the basic group, the UE can determine a current time-domain symbol according to a first corresponding relationship between the SSB and the time-domain symbol specified by the system to complete the synchronization process.

When the SSB belongs to the extended group, the UE can also determine a current time-domain symbol according to the second correspondence relationship between the SSB and the time-domain symbol specified by the system to complete the synchronization process.

Taking the basic group and the extended group corresponding to different time domain resources as an example, the SSB currently received by the UE may belong to the basic group or the extended group. The synchronization process can be completed according to the previous introduction.

Taking the basic group and the extended group corresponding to different frequency domain resources as an example, the basic group corresponds to carrier 1, and the extended group corresponds to carrier 2. For a single-carrier UE operated on carrier 1, only SSBs in the basic group can be received, and the current time-domain symbol can be determined according to the first corresponding relationship specified by the system to complete the synchronization process. For a single-carrier UE operated on carrier 2, only SSBs in the extended group can be received, and the current time-domain symbol can be determined according to the second corresponding relationship specified by the system to complete the synchronization process. For a multi-carrier UE operated on both carrier 1 and carrier 2, the currently received SSB may belong to the basic group or the extended group. The synchronization process can be completed according to the first correspondence relationship or the second correspondence relationship.

In one embodiment, the information block further includes offset indication information, which is used to indicate an offset of the time-frequency resource corresponding to a SSB in the extended group relative to the time-frequency resource corresponding to the SSB that has the same sequence number in the basic group.

The method also includes step A.

In step A, when it is determined that the SSB belongs to the extended group, time-frequency resource corresponding to the received SSB is determined according to the time-frequency resource corresponding to the SSB with the same sequence number in the basic group and the offset indication information.

If the currently received SSB belongs to the extended group, the UE can parse out the sequence number of the currently received SSB. The time-frequency resource corresponding to the SSB in the basic group is determined according to the sequence number, and by combining with the offset indication information, the time-frequency resource corresponding to the currently received SSB can be determined. The synchronization process can be further performed.

For example, the currently received SSB by the UE is SSB0 in the extended group. The UE knows that the time-frequency resource corresponding to SSB0 in the basic group is carrier 1 of the time-domain symbol S2, and the offset indicated by the offset indication information is combined with the time-frequency resource to determine that the time-frequency resource corresponding to the currently received SSB0 in the extended group is carrier 2 of S8.

The UE can also determine time-frequency resources corresponding to other SSBs in the extended group according to the offset indication information and the known first correspondence relationship, so that the UE can monitor the SSB and perform synchronization processing subsequently.

In an embodiment, the offset indication information includes time domain offset indication information.

The step A includes step A1.

In step A1, the time-frequency resource corresponding to the received SSB is determined according to the time-frequency resource corresponding to the SSB with the same sequence number in the basic group and the time-domain offset indication information.

For example, the SSB currently received by the UE is SSB0 in the extended group. The UE knows that the time-frequency resource corresponding to SSB0 in the basic group is carrier 1 of the time-domain symbol S2, and the time-domain offset indication information is 6, it can determine that the time-frequency resource corresponding to the currently received SSB0 in the extended group is S8, and the UE can complete the synchronization process according to the time domain symbol S8, and the time domain symbols corresponding to other SSBs in the extended group can be determined, so as to facilitate subsequent monitoring of SSBs in the extended group. The UE can monitor a plurality of carrier units on subsequent time-domain symbols.

In an embodiment, the offset indication information includes time domain offset indication information and frequency domain offset indication information.

The step A includes step A2.

In step A2, the time-frequency resource corresponding to the received SSB is determined according to the time-frequency resource corresponding to the SSB with the same sequence number in the basic group, the time-domain offset indication information and frequency-domain offset indication information.

For example, the SSB currently received by the UE is SSB0 in the extended group. The UE knows that the time-frequency resource corresponding to SSB0 in the basic group is the carrier 1 of the time-domain symbol S2, the time-domain offset indication information is 6, and the frequency-domain offset indication information is 1. It can be determined that the time-frequency resource corresponding to the currently received SSB0 in the extended group is carrier 2 on S8. The UE can complete synchronization process according to the time-domain symbol S8, and can determine time-domain symbols and frequency-domain carriers corresponding to other SSBs in the extension group, so as to facilitate subsequent monitoring of SSBs in the extension group. The UE only needs to monitor corresponding carrier units on subsequent time domain symbols.

In an embodiment, a time-frequency resource corresponding to a SSB in the extended group and a time-frequency resource corresponding to a SSB with a different sequence number in the basic group are the same in the time domain, and correspond to different carrier units in the frequency domain.

Before receiving the information block, the method further includes step B.

In step B, a plurality of carrier units are monitored in the time domain corresponding to the SSB in the basic group.

The UE knows the time domain symbol corresponding to the SSB in the basic group in advance, and by monitoring a plurality of carrier units on the time domain symbol, the UE can receive the SSB in the basic group and the SSB in the extended group, and can complete the synchronization processing in a timely manner and reduce delay.

For example, the base station sends SSB1 in the basic group on carrier 1 of S8, and sends SSB0 in the extended group on carrier 2 of S8. The UE monitors carrier 1 and carrier 2 of S8, and can receive SSB1 in the basic group SSB1 and SSB0 in the extended group. Even if the base station does not send SSB1 in the basic group, the UE can still receive SSB0 in the extended group, and the synchronization process can still be completed.

In one embodiment, the SSB in the extended group includes a mark identifying the extended group.

The step 602 includes step C.

In step C, it is determined whether the SSB belongs to the basic group or the extended group according to whether the SSB includes the mark.

After the UE receives the SSB, it can parse the sequence number from it, and if there is a mark, it can also parse the mark. For example, if SSB0 is parsed, it can be determined that it belongs to the basic group. If SSB0-1 is parsed, it can be determined that it belongs to the first extended group. After determining the group to which the received SSB belongs, corresponding synchronization processing can be performed.

The implementation on the UE side is described in the following embodiment.

Figure 7:
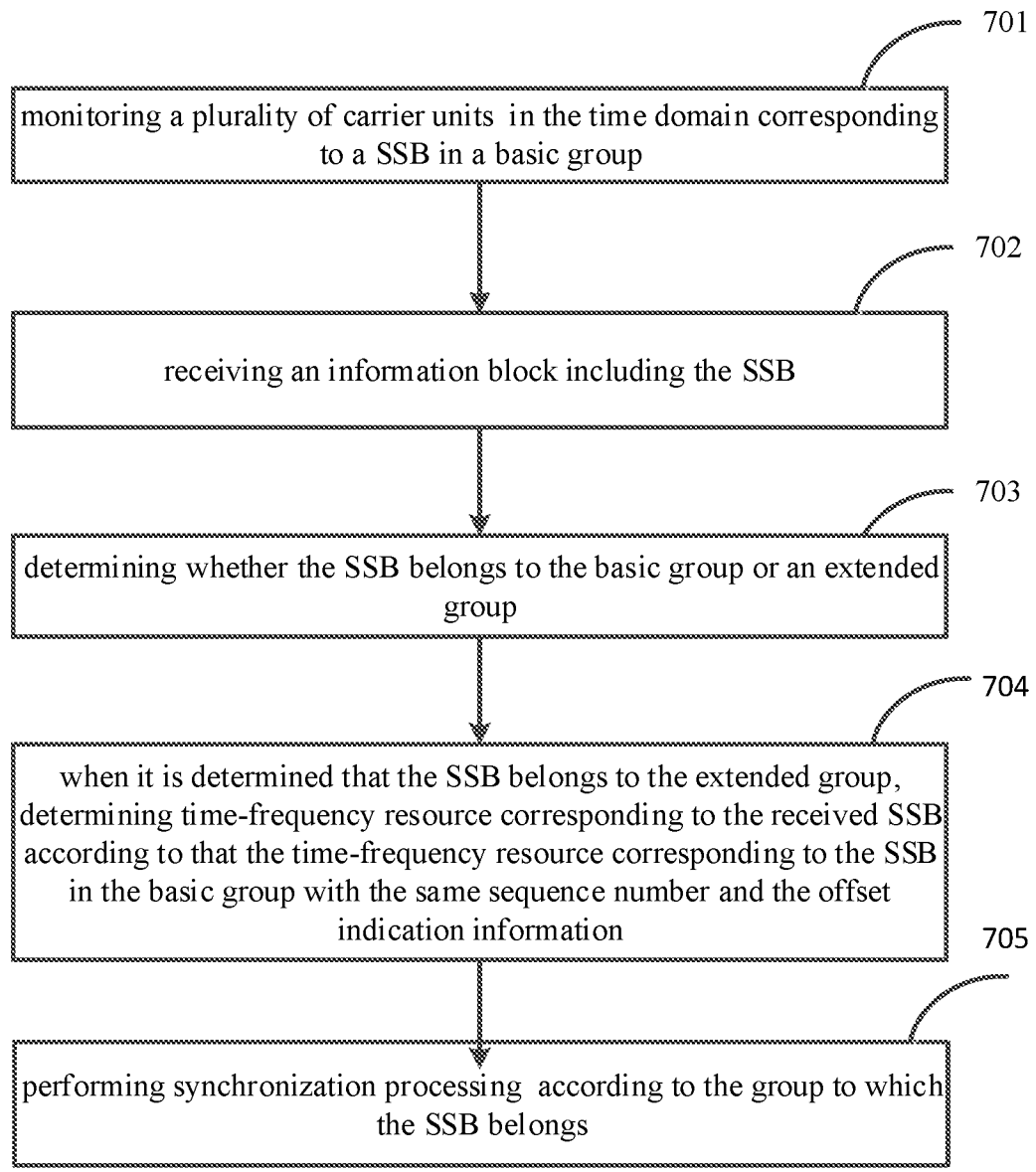
FIG. 7 is a flowchart showing a method for transmitting a synchronization signal according to an embodiment of the present disclosure.

FIG. 7 is a flowchart showing a method for transmitting a synchronization signal according to an embodiment. The method for transmitting a synchronization signal is used in a terminal, in which the terminal may be a mobile phone, a computer, a digital broadcasting terminal, or a message transmission device, a game console, a tablet device, a medical equipment, a fitness equipment, a personal digital assistant, etc. As shown in FIG. 7, the method includes the following steps 701-705.

In step 701, a plurality of carrier units are monitored in the time domain corresponding to a SSB in a basic group.

In step 702, an information block is received, which includes the SSB.

In step 703, it is determined whether the SSB belongs to the basic group or an extended group; in which the basic group and the extended group include SSBs with a same sequence number; a SSB with the same sequence number in the basic group and a SSB with the same sequence number in the extended group correspond to different time-frequency resources.

In step 704, when it is determined that the SSB belongs to the extended group, time-frequency resource corresponding to the received SSB is determined according to that the time-frequency resource corresponding to the SSB in the basic group with the same sequence number and the offset indication information.

In step 705, synchronization processing is performed according to the group to which the SSB belongs.

Figure 8:
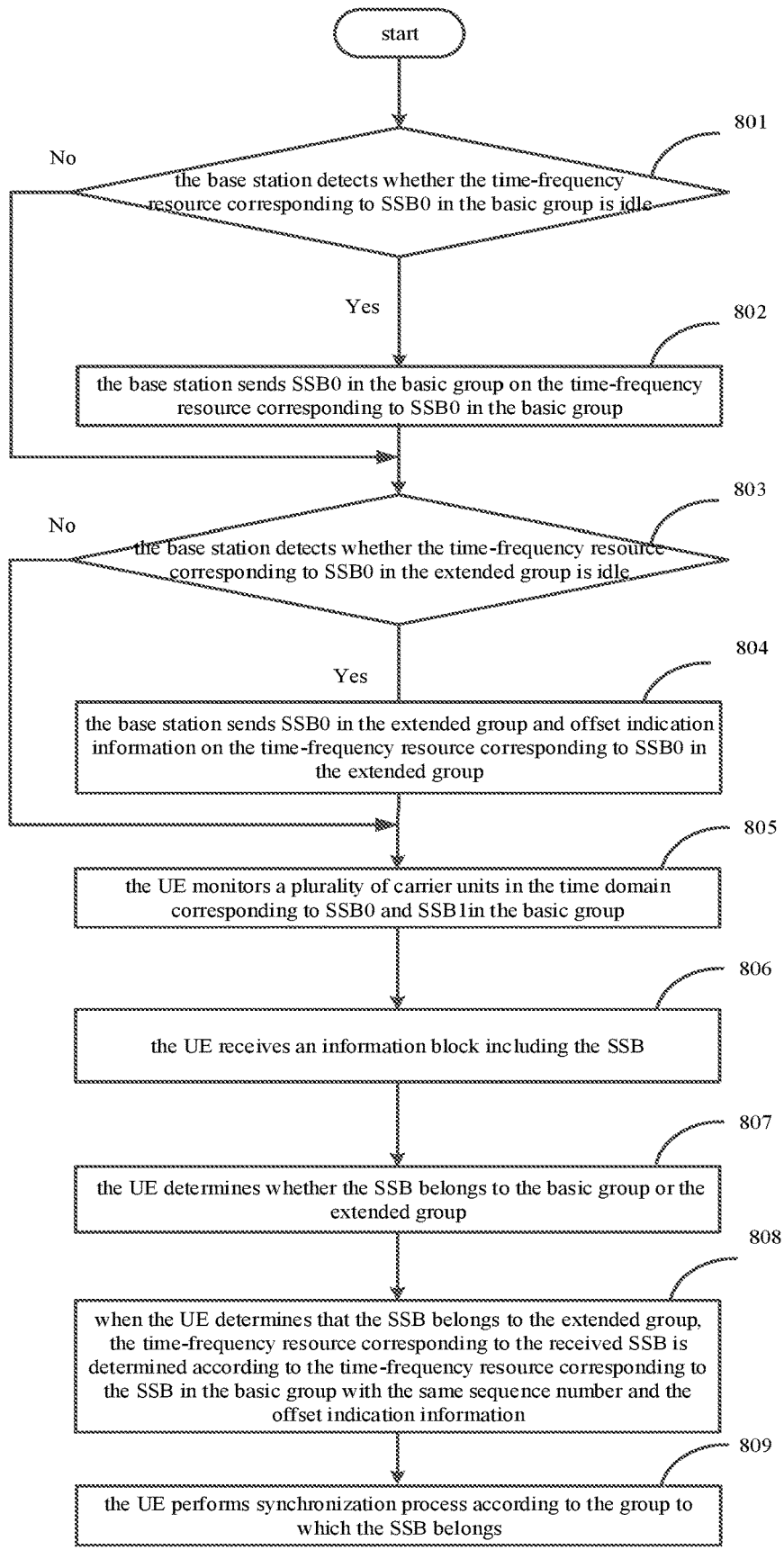
FIG. 8 is a flowchart showing a method for transmitting a synchronization signal according to an embodiment of the present disclosure.

FIG. 8 is a flowchart showing a method for transmitting a synchronization signal according to an embodiment. As shown in FIG. 8, the method includes the following steps 801-809.

In step 801, the base station detects whether the time-frequency resource corresponding to SSB0 in the basic group is idle; when it is idle, proceed to step 802, and when it is not idle, proceed to step 803.

In step 802, the base station sends SSB0 in the basic group on the time-frequency resource corresponding to SSB0 in the basic group.

In step 803, the base station detects whether the time-frequency resource corresponding to SSB0 in the extended group is idle; when it is idle, it proceeds to step 804, and when it is not idle, this process ends.

The time domain symbol corresponding to SSB0 in the extended group is the same as the time domain symbol corresponding to SSB1 in the basic group.

In step 804, the base station sends SSB0 in the extended group and offset indication information on the time-frequency resource corresponding to SSB0 in the extended group.

In step 805, the UE monitors a plurality of carrier units in the time domain corresponding to SSB0 and SSB1 in the basic group.

In step 806, the UE receives an information block, which includes the SSB.

In step 807, the UE determines whether the SSB belongs to the basic group or the extended group; in where the basic group and the extended group include SSBs with the same sequence number; and the SSB in the basic group with the same sequence number and the SSB in the extended group with the same sequence number correspond to different time-frequency resources.

In step 808, when the UE determines that the SSB belongs to the extended group, the time-frequency resource corresponding to the received SSB is determined according to the time-frequency resource corresponding to the SSB in the basic group with the same sequence number and the offset indication information.

In step 809, the UE performs synchronization process according to the group to which the SSB belongs.

The above embodiments can be freely combined according to actual needs.

The following are device embodiments of the present disclosure, which can be used to implement the method embodiments of the present disclosure.

Figure 9:
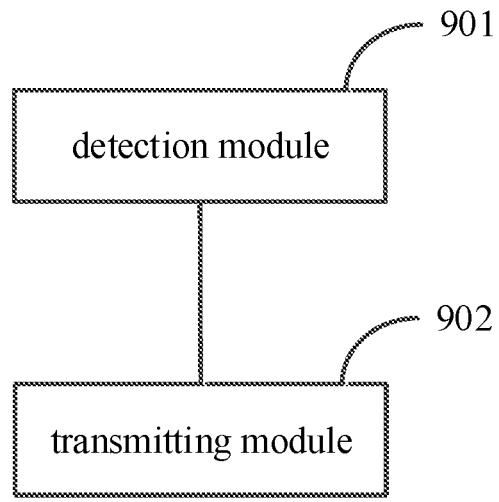
FIG. 9 is a block diagram showing a device for transmitting a synchronization signal according to an embodiment of the present disclosure.

FIG. 9 is a block diagram showing a device for transmitting a synchronization signal according to an embodiment. The device can be implemented as part or all of an electronic device through software, hardware or a combination of both. Referring to FIG. 9, the device for transmitting a synchronization signal is applied for a base station, the device includes a detection module 901 and a transmitting module 902.

The detection module 901 is configured to perform channel detection for a time-frequency resource corresponding to a synchronous broadcast block (SSB) in a basic group to be sent and a time-frequency resource corresponding to a SSB in an extended group to be sent respectively, to detect whether a time-frequency resource is idle, wherein each of the basic group and the extended group includes a SSB with a same sequence number; the SSB with the same sequence number in the basic group and the SSB with the same sequence number in the extended group correspond to different time-frequency resources.

The transmitting module 902 is configured to, when a time-frequency resource corresponding to at least one SSB in the basic group and the extended group is idle, transmit an information block on the time-frequency resource, and the information block including the at least one SSB.

In one embodiment, the time-frequency resource corresponding to the SSB with the same sequence number in the basic group and the time-frequency resource corresponding to the SSB with the same sequence number in the extended group are not continuous in the time domain, and correspond to different carrier units in the frequency domain.

In an embodiment, a time-frequency resource corresponding to a SSB in the extended group and a time-frequency resource corresponding to a SSB with a different sequence number in the basic group are the same in the time domain, and correspond to different carrier units in the frequency domain.

In one embodiment, the information block further includes offset indication information, which is used to indicate an offset of the time-frequency resource corresponding to the SSB with the same sequence number in the extended group relative to the time-frequency resource corresponding to the SSB with the same sequence number in the basic group.

In an embodiment, the offset indication information includes time domain offset indication information, or includes time domain offset indication information and frequency domain offset indication information.

In one embodiment, the SSB in the extended group includes a mark identifying the extended group.

Figure 10:
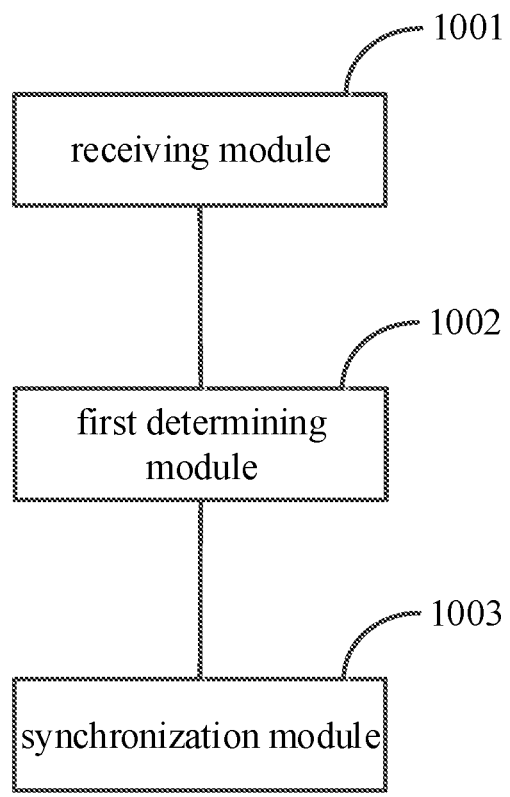
FIG. 10 is a block diagram showing a device for transmitting a synchronization signal according to an embodiment of the present disclosure.

FIG. 10 is a block diagram showing a device for transmitting a synchronization signal according to an embodiment. The device can be implemented as part or all of an electronic device through software, hardware, or a combination of both. Referring to FIG. 10, the device for transmitting a synchronization signal is applied to a UE, the device includes a receiving module 1001, a first determining module 1002, and a synchronization module 1003.

The receiving module 1001 is configured to receive an information block, which includes an SSB.

The first determining module 1002 is configured to determine whether the SSB belongs to a basic group or an extended group; in which the basic group and the extended group include SSBs with the same sequence number; a SSB with the same sequence number in the basic group and a SSB with the same sequence number in the extended group correspond to different time-frequency resources.

The synchronization module 1003 is configured to perform synchronization process according to the group to which the SSB belongs.

In one embodiment, the information block further includes offset indication information, which is used to indicate an offset of the time-frequency resource corresponding to the SSB with the same sequence number in the extended group relative to the time-frequency resource corresponding to the SSB with the same sequence number in the basic group.

Figure 11:
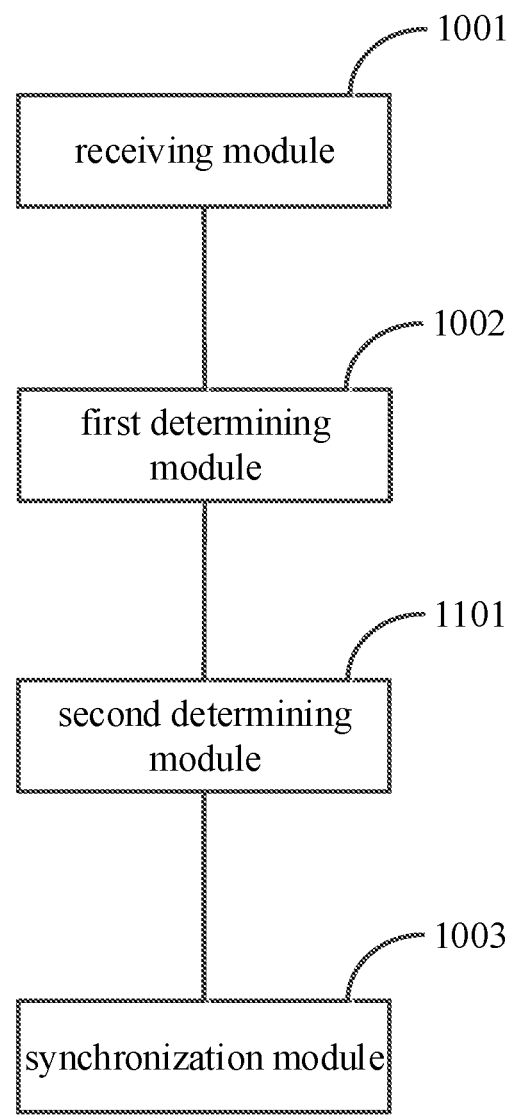
FIG. 11 is a block diagram showing a device for transmitting synchronization signals according to an exemplary embodiment.

As shown in FIG. 11, the device further includes a second determining module 1101.

The second determining module 1101 is configured to, when it is determined that the SSB belongs to the extended group, determine time-frequency resource corresponding to the received SSB according to the time-frequency resource corresponding to the SSB with the same sequence number in the basic group and the offset indication information.

In an embodiment, the offset indication information includes time domain offset indication information.

Figure 12:
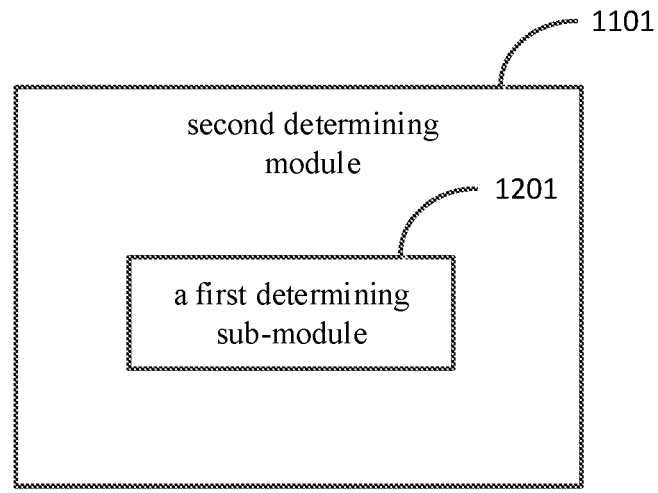
FIG. 12 is a block diagram showing a second determining module according to an embodiment of the present disclosure.

As shown in FIG. 12, the second determining module 1101 includes a first determining sub-module 1201.

The first determining sub-module 1201 is configured to determine the time-frequency resource corresponding to the received SSB according to the time-frequency resource corresponding to the SSB with the same sequence number in the basic group and the time-domain offset indication information.

Or in an embodiment, the offset indication information includes time domain offset indication information and frequency domain offset indication information.

Figure 13:
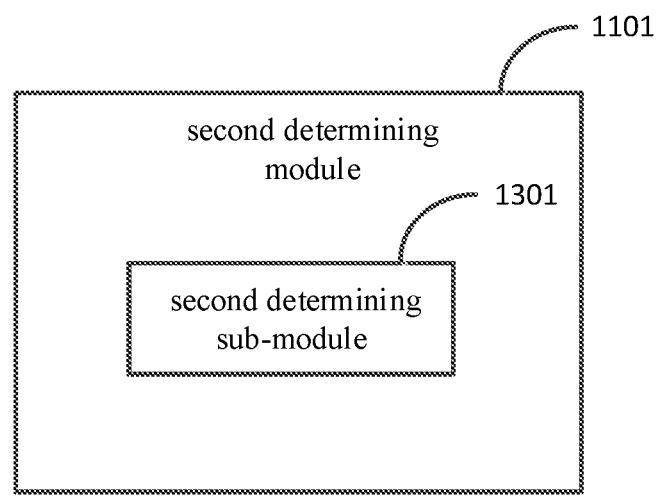
FIG. 13 is a block diagram showing a second determining module according to an embodiment of the present disclosure.

As shown in FIG. 13, the second determining module 1101 includes a second determining sub-module 1301.

The second determining submodule 1301 is configured to determine the time-frequency resource corresponding to the received SSB according to the time-frequency resource corresponding to the SSB with the same sequence number in the basic group, the time-domain offset indication information and frequency-domain offset indication information.

In an embodiment, a time-frequency resource corresponding to a SSB in the extended group and a time-frequency resource corresponding to a SSB with a different sequence number in the basic group are the same in the time domain, and correspond to different carrier units in the frequency domain.

Figure 14:
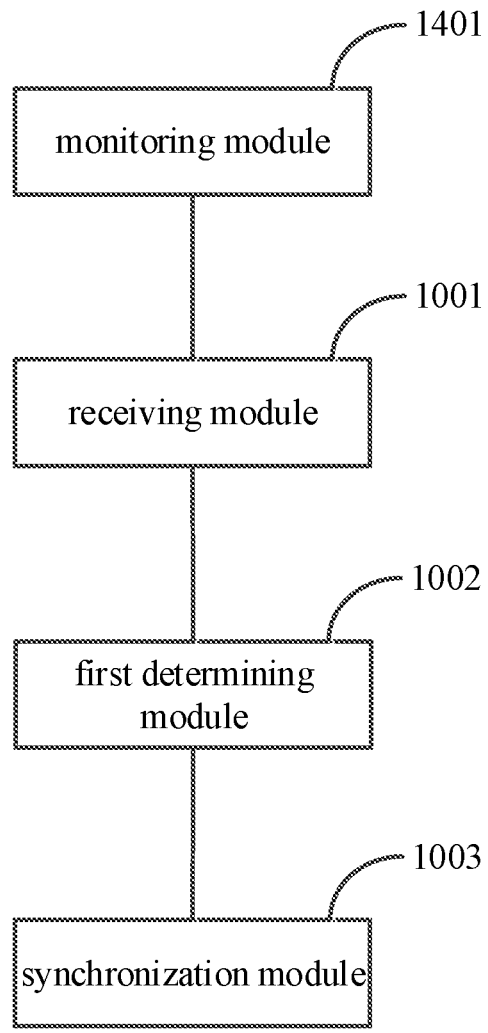
FIG. 14 is a block diagram showing a device for transmitting a synchronization signal according to an embodiment of the present disclosure.

As shown in FIG. 14, before receiving the information block, the device further includes: a monitoring module 1401.

The monitoring module 1401 is configured to monitor a plurality of carrier units in the time domain corresponding to the SSB in the basic group.

In one embodiment, the SSB in the extended group includes a mark identifying the extended group.

Figure 15:
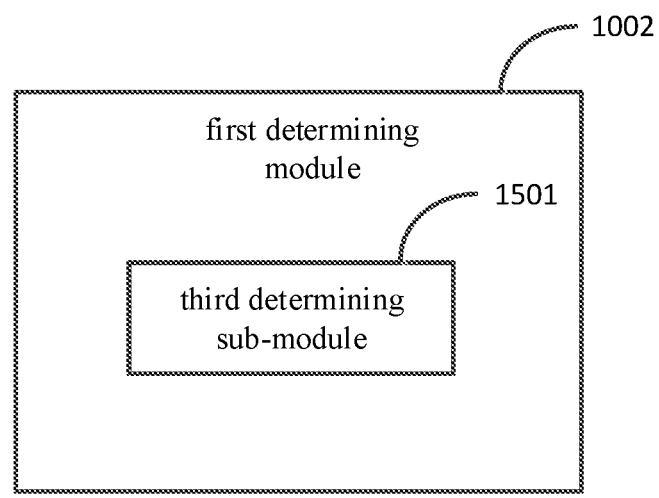
FIG. 15 is a block diagram showing a first determining module according to an embodiment of the present disclosure.

As shown in FIG. 15, the first determining module 1002 includes a third determining sub-module 1501.

The third determining sub-module 1501 is configured to determine whether the SSB belongs to the basic group or the extended group according to whether the SSB includes the mark.

Regarding the device in the foregoing embodiments, the specific implementation of each module has been described in detail in the embodiments of the method, and detailed description will not be repeated herein.

Figure 16:
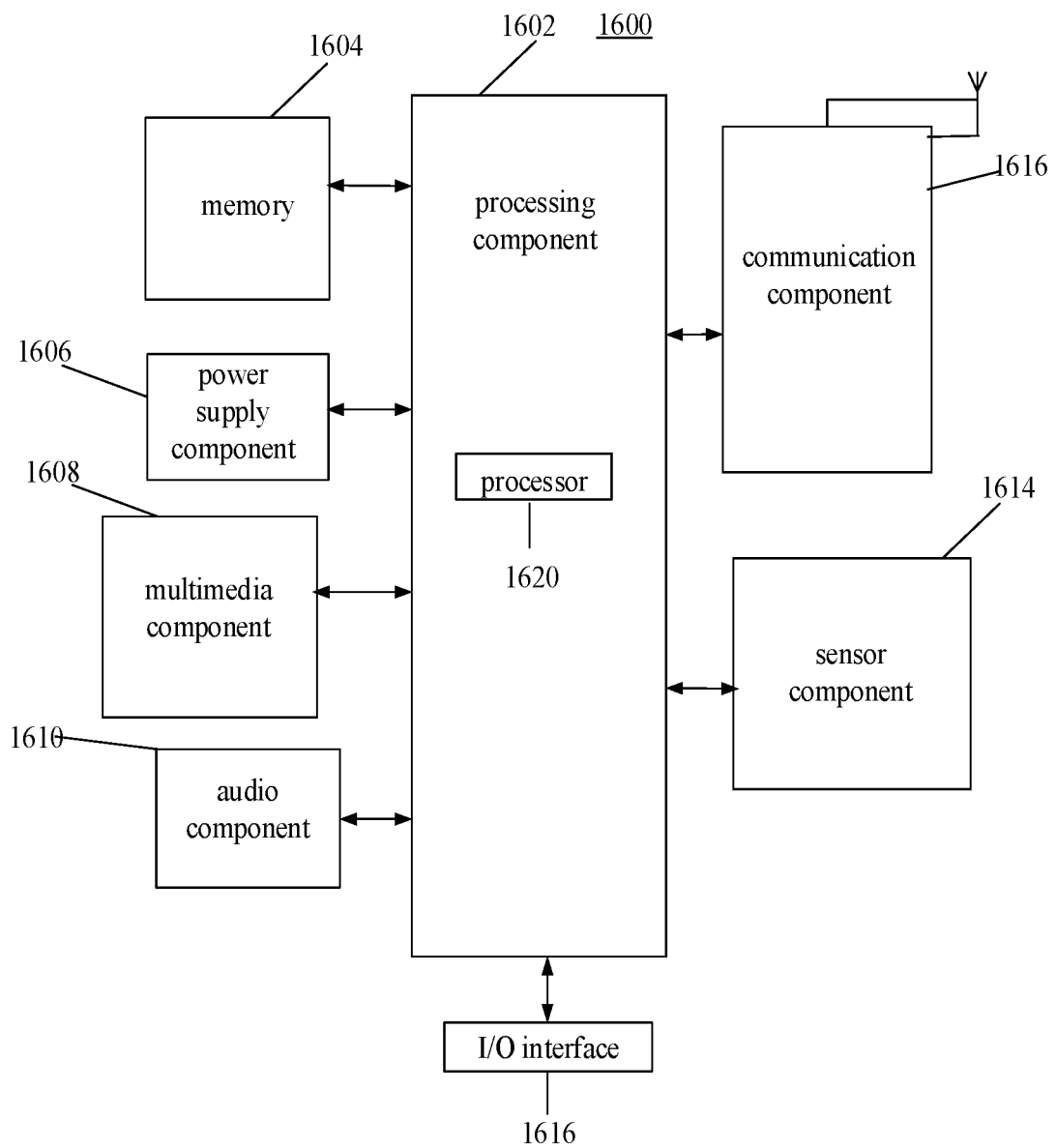
FIG. 16 is a block diagram showing a device for transmitting a synchronization signal according to an embodiment of the present disclosure.

FIG. 16 is a block diagram showing a device for transmitting a synchronization signal according to an embodiment. For example, the device 1600 may be a mobile phone, a computer, a digital broadcasting terminal, a message transmission device, a game console, a tablet device, a medical device, a fitness device, a personal digital assistant, etc.

The device 1600 may include one or more of the following components: a processing component 1602, a memory 1604, a power supply component 1606, a multimedia component 1608, an audio component 1610, an input/output (I/O) interface 1616, a sensor component 1614, and a communication component 1616.

The processing component 1602 generally controls the overall operations of the device 1600, such as operations associated with display, telephone calls, data communications, camera operations, and recording operations. The processing component 1602 may include one or more processors 1620 to execute instructions to complete all or part of the steps of the foregoing method. In addition, the processing component 1602 may include one or more modules to facilitate the interaction between the processing component 1602 and other components. For example, the processing component 1602 may include a multimedia module to facilitate the interaction between the multimedia component 1608 and the processing component 1602.

The memory 1604 is configured to store various types of data to support operations in the device 1600. Examples of such data include instructions for any application or method operating on the device 1600, contact data, phone book data, messages, pictures, videos, etc. The memory 1604 can be implemented by any type of volatile or non-volatile storage device or their combination, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 1606 provides power to various components of the device 1600. The power supply component 1606 may include a power management system, one or more power supplies, and other components associated with the generation, management, and distribution of power for the device 1600.

The multimedia component 1608 includes a screen that provides an output interface between the device 1600 and a user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundary of the touch or slide action, but also detect the duration and pressure related to the touch or slide operation. In some embodiments, the multimedia component 1608 includes a front camera and/or a rear camera. When the device 1600 is in an operation mode, such as a shooting mode or a video mode, the front camera and/or the rear camera can receive external multimedia data. Each of front camera and rear camera can be a fixed optical lens system or have focal length and optical zoom capabilities.

The audio component 1610 is configured to output and/or input audio signals. For example, the audio component 1610 includes a microphone (MIC). When the device 1600 is in an operating mode, such as a call mode, a recording mode, and a voice recognition mode, the microphone is configured to receive external audio signals. The received audio signal may be further stored in the memory 1604 or transmitted via the communication component 1616. In some embodiments, the audio component 1610 further includes a speaker for outputting audio signals.

The I/O interface 1616 provides an interface between the processing component 1602 and a peripheral interface module. The peripheral interface module may be a keyboard, a click wheel, a button, and the like. These buttons may include but are not limited to: a home button, a volume button, a start button, and a lock button.

The sensor component 1614 includes one or more sensors for providing the device 1600 with various aspects of state assessment. For example, the sensor component 1614 can detect the on/off state of the device 1600 and the relative positioning of the components. For example, the component is the display and the keypad of the device 1600. The sensor component 1614 can also detect the position change of the device 1600 or a component of the device 1600, presence or absence of contact between the user and the device 1600, the orientation or acceleration/deceleration of the device 1600, and the temperature change of the device 1600. The sensor component 1614 may include a proximity sensor configured to detect the presence of nearby objects when there is no physical contact. The sensor component 1614 may also include a light sensor, such as a CMOS or CCD image sensor, for use in imaging applications. In some embodiments, the sensor component 1614 may also include an acceleration sensor, a gyroscope sensor, a magnetic sensor, a pressure sensor or a temperature sensor.

The communication component 1616 is configured to facilitate wired or wireless communication between the device 1600 and other devices. The device 1600 can access a wireless network based on a communication standard, such as WiFi, 2G or 3G, or a combination thereof. In an exemplary embodiment, the communication component 1616 receives a broadcast signal or broadcast related information from an external broadcast management system via a broadcast channel. In an exemplary embodiment, the communication component 1616 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the device 1600 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components, used to perform the above methods.

In an exemplary embodiment, there is also provided a non-transitory computer-readable storage medium including instructions, such as a memory 1604 including instructions, which may be executed by the processor 1620 of the device 1600 to complete the foregoing method. For example, the non-transitory computer-readable storage medium may be a ROM, a random-access memory (RAM), a CD-ROM, a magnetic tape, a floppy disk, an optical data storage device, etc.

In an exemplary embodiment, a device for transmitting a synchronization signal is provided, the device includes:
a processor; and
a memory configured to store instructions executable by the processor,
wherein, the processor is configured to:
receive an information block, which includes a SSB;
determine whether the SSB belongs to a basic group or an extended group; in which the basic group and the extended group include SSBs with the same sequence number; a SSB with the same sequence number in the basic group and a SSB with the same sequence number in the extended group correspond to different time-frequency resources;
perform synchronization process according to the group to which the SSB belongs.

The aforementioned processor may also be configured so that:
the information block further includes offset indication information, which is used to indicate an offset of the time-frequency resource corresponding to the SSB with the same sequence number in the extended group relative to the time-frequency resource corresponding to the SSB with the same sequence number in the basic group.

The method also includes:
when it is determined that the SSB belongs to the extended group, determining time-frequency resource corresponding to the received SSB according to the time-frequency resource corresponding to the SSB with the same sequence number in the basic group and the offset indication information.

The aforementioned processor may also be configured so that:
the offset indication information includes time domain offset indication information.

The determining time-frequency resource corresponding to the received SSB according to the time-frequency resource corresponding to the SSB with the same sequence number in the basic group and the offset indication information includes:
determining the time-frequency resource corresponding to the received SSB according to the time-frequency resource corresponding to the SSB with the same sequence number in the basic group and the time-domain offset indication information.

Or, the offset indication information includes time domain offset indication information and frequency domain offset indication information.

The determining time-frequency resource corresponding to the received SSB according to the time-frequency resource corresponding to the SSB with the same sequence number in the basic group and the offset indication information includes:
determining the time-frequency resource corresponding to the received SSB according to the time-frequency resource corresponding to the SSB with the same sequence number in the basic group, the time-domain offset indication information and frequency-domain offset indication information.

The aforementioned processor may also be configured so that:
a time-frequency resource corresponding to a SSB in the extended group and a time-frequency resource corresponding to a SSB with a different sequence number in the basic group are the same in the time domain, and correspond to different carrier units in the frequency domain.

Before receiving the information block, the method further includes:
monitoring a plurality of carrier units in the time domain corresponding to the SSB in the basic group.

The aforementioned processor may also be configured so that:
the SSB in the extended group includes a mark identifying the extended group.

The determining whether the SSB belongs to a basic group or an extended group includes:
determining whether the SSB belongs to the basic group or the extended group according to whether the SSB includes the mark.

A computer-readable storage medium is provided. When instructions in the storage medium are executed by a processor of a device, the device can execute the abovementioned method for transmitting a synchronization signal. The method includes:
receiving an information block, which includes a SSB;
determining whether the SSB belongs to a basic group or an extended group; in which the basic group and the extended group include SSBs with the same sequence number; a SSB with the same sequence number in the basic group and a SSB with the same sequence number in the extended group correspond to different time-frequency resources;

performing synchronization process according to the group to which the SSB belongs.

The instructions in the storage medium may also include:

the information block further includes offset indication information, which is used to indicate an offset of the time-frequency resource corresponding to the SSB with the same sequence number in the extended group relative to the time-frequency resource corresponding to the SSB with the same sequence number in the basic group.

The method also includes:

when it is determined that the SSB belongs to the extended group, determining time-frequency resource corresponding to the received SSB according to the time-frequency resource corresponding to the SSB with the same sequence number in the basic group and the offset indication information.

The instructions in the storage medium may also include:

the offset indication information includes time domain offset indication information.

The determining time-frequency resource corresponding to the received SSB according to the time-frequency resource corresponding to the SSB with the same sequence number in the basic group and the offset indication information includes:

determining the time-frequency resource corresponding to the received SSB according to the time-frequency resource corresponding to the SSB with the same sequence number in the basic group and the time-domain offset indication information.

Or, the offset indication information includes time domain offset indication information and frequency domain offset indication information.

The determining time-frequency resource corresponding to the received SSB according to the time-frequency resource corresponding to the SSB with the same sequence number in the basic group and the offset indication information includes:

determining the time-frequency resource corresponding to the received SSB according to the time-frequency resource corresponding to the SSB with the same sequence number in the basic group, the time-domain offset indication information and frequency-domain offset indication information.

The instructions in the storage medium may also include:

the time-frequency resource corresponding to the SSB with the same sequence number in the extended group and the time-frequency resource corresponding to the SSB with the same sequence number in the basic group are the same in the time domain, and correspond to different carrier units in the frequency domain.

Before receiving the information block, the method further includes:

monitoring a plurality of carrier units in the time domain corresponding to the SSB in the basic group.

The instructions in the storage medium may also include:

the SSB in the extended group includes a mark identifying the extended group.

The determining whether the SSB belongs to a basic group or an extended group includes:

determining whether the SSB belongs to the basic group or the extended group according to whether the SSB includes the mark.

Figure 17:
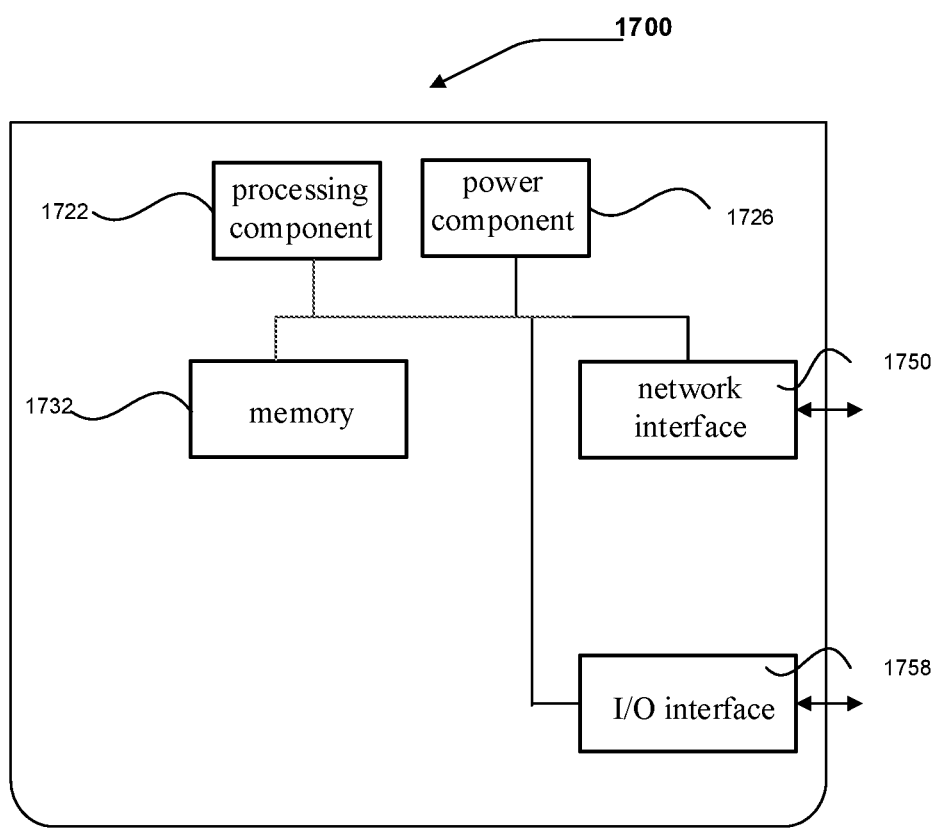
FIG. 17 is a block diagram showing a device for transmitting a synchronization signal according to an embodiment of the present disclosure.

FIG. 17 is a block diagram showing a device 1700 for synchronizing data according to an embodiment. For example, the device 1700 may be provided as a computer. Referring to FIG. 17, the device 1700 includes a processing component 1722, which further includes one or more processors, and a memory resource represented by a memory 1732 for storing instructions executable by the processing component 1722, such as application programs. The application programs stored in the memory 1732 may include one or more modules each corresponding to a set of instructions. In addition, the processing component 1722 is configured to execute instructions to perform the aforementioned method to synchronize data.

The device 1700 may also include a power component 1726 configured to perform power management of the device 1700, a wired or wireless network interface 1750 configured to connect the device 1700 to the network, and an input/output (I/O) interface 1758. The device 1700 can operate based on an operating system stored in the memory 1732, such as Windows Server™, Mac OS X™, Unix™, Linux™, FreeBSD™ or the like.

In an exemplary embodiment, a device for transmitting a synchronization signal is provided, the device includes:

a processor; and a memory configured to store instructions executable by the processor, wherein, the processor is configured to:

perform channel detection for a time-frequency resource corresponding to a synchronous broadcast block (SSB) in a basic group to be sent and a time-frequency resource corresponding to a SSB in an extended group to be sent respectively, to detect whether a time-frequency resource is idle, wherein each of the basic group and the extended group includes a SSB with a same sequence number; the SSB with the same sequence number in the basic group and the SSB with the same sequence number in the extended group correspond to different time-frequency resources;

when a time-frequency resource corresponding to at least one SSB in the basic group and the extended group is idle, transmit an information block on the time-frequency resource, and the information block including the at least one SSB.

The aforementioned processor may also be configured so that:

the time-frequency resource corresponding to the SSB with the same sequence number in the basic group and the time-frequency resource corresponding to the SSB with the same sequence number in the extended group are not continuous in the time domain, and correspond to different carrier units in the frequency domain.

The aforementioned processor may also be configured so that:

the time-frequency resource corresponding to the SSB with the same sequence number in the extended group and the time-frequency resource corresponding to the SSB with the same sequence number in the basic group are the same in the time domain, and correspond to different carrier units in the frequency domain.

The aforementioned processor may also be configured so that:

the information block further includes offset indication information, which is used to indicate an offset of the time-frequency resource corresponding to the SSB with the same sequence number in the extended group relative to the time-frequency resource corresponding to the SSB with the same sequence number in the basic group.

The aforementioned processor may also be configured so that:

the offset indication information includes time domain offset indication information, or includes time domain offset indication information and frequency domain offset indication information.

The aforementioned processor may also be configured so that:

the SSB in the extended group includes a mark identifying the extended group.

A computer-readable storage medium is provided. When instructions in the storage medium are executed by a processor of a device, the device can execute the above-mentioned method for transmitting a synchronization signal. The method includes:

performing channel detection for a time-frequency resource corresponding to a synchronous broadcast block (SSB) in a basic group to be sent and a time-frequency resource corresponding to a SSB in an extended group to be sent respectively, to detect whether a time-frequency resource is idle, wherein each of the basic group and the extended group includes a SSB with a same sequence number; the SSB with the same sequence number in the basic group and the SSB with the same sequence number in the extended group correspond to different time-frequency resources;

when a time-frequency resource corresponding to at least one SSB in the basic group and the extended group is idle, transmitting an information block on the time-frequency resource, and the information block including the at least one SSB.

The instructions in the storage medium may also include:

the time-frequency resource corresponding to the SSB with the same sequence number in the basic group and the time-frequency resource corresponding to the SSB with the same sequence number in the extended group are not continuous in the time domain, and correspond to different carrier units in the frequency domain.

The instructions in the storage medium may also include:

the time-frequency resource corresponding to the SSB with the same sequence number in the extended group and the time-frequency resource corresponding to the SSB with the same sequence number in the basic group are the same in the time domain, and correspond to different carrier units in the frequency domain.

The instructions in the storage medium may also include:

the information block further includes offset indication information, which is used to indicate an offset of the time-frequency resource corresponding to the SSB with the same sequence number in the extended group relative to the time-frequency resource corresponding to the SSB with the same sequence number in the basic group.

The instructions in the storage medium may also include:

the offset indication information includes time domain offset indication information, or includes time domain offset indication information and frequency domain offset indication information.

The instructions in the storage medium may also include:

the SSB in the extended group includes a mark identifying the extended group.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings and that various modifications and changes can be made without departing from the scope thereof. It is intended that the scope of the invention only be limited by the appended claims.

What is claimed is:

1. A method for transmitting a synchronization signal, applied to a base station side, comprising:

performing channel detection for a time-frequency resource corresponding to a synchronous broadcast block (SSB) in a basic group to be sent and a time-frequency resource corresponding to a SSB in an extended group to be sent respectively, to detect whether the time-frequency resource is idle, wherein each of the basic group and the extended group includes a SSB with a same sequence number; the SSB with the same sequence number in the basic group and the SSB with the same sequence number in the extended group correspond to different time-frequency resources;

when a time-frequency resource corresponding to at least one SSB in the basic group and the extended group is idle, transmitting an information block on the time-frequency resource, the information block including the at least one SSB.

2. The method according to claim 1, wherein the time-frequency resource corresponding to the SSB with the same sequence number in the basic group and the time-frequency resource corresponding to the SSB with the same sequence number in the extended group are not continuous in a time domain, and correspond to different carrier units in a frequency domain.

3. The method according to claim 1, wherein the time-frequency resource corresponding to the SSB in the extended group and the time-frequency resource corresponding to the SSB with a different sequence number in the basic group are the same in a time domain, and correspond to different carrier units in a frequency domain.

4. The method according to claim 1, wherein the information block further includes offset indication information used to indicate an offset of the time-frequency resource corresponding to the SSB with the same sequence number in the extended group relative to the time-frequency resource corresponding to the SSB with the same sequence number in the basic group.

5. The method according to claim 4, wherein the offset indication information includes time domain offset indication information, or includes time domain offset indication information and frequency domain offset indication information.

6. The method according to claim 1, wherein the SSB in the extended group includes a mark identifying the extended group.

7. A method for transmitting a synchronization signal, applied to a user equipment (UE) side, comprising:

receiving an information block including an SSB;

determining whether the SSB belongs to a basic group or an extended group, wherein each of the basic group and the extended group includes a SSB with a same sequence number; the SSB with the same sequence number in the basic group and the SSB with the same sequence number in the extended group correspond to different time-frequency resources;

performing synchronization process according to the group to which the SSB belongs.

8. The method according to claim 7, wherein the information block further includes offset indication information used to indicate an offset of the time-frequency resource corresponding to the SSB with the same sequence number in the extended group relative to the time-frequency resource corresponding to the SSB with the same sequence number in the basic group;

the method further comprises:
in response to determining that the SSB belongs to the extended group, determining time-frequency resource corresponding to the received SSB according to the time-frequency resource corresponding to the SSB with the same sequence number in the basic group and the offset indication information.

9. The method according to claim 8, wherein the offset indication information includes time domain offset indication information and frequency domain offset indication information;

the determining time-frequency resource corresponding to the received SSB according to the time-frequency resource corresponding to the SSB with the same sequence number in the basic group and the offset indication information comprises:
determining the time-frequency resource corresponding to the received SSB according to the time-frequency resource corresponding to the SSB with the same sequence number in the basic group, the time-domain offset indication information and frequency-domain offset indication information.

10. The method according to claim 8, wherein the offset indication information comprises time domain offset indication information;

the determining time- and/or frequency resource corresponding to the received SSB according to the time-frequency resource corresponding to the SSB with the same sequence number in the basic group and the offset indication information includes:
determining the time-frequency resource corresponding to the received SSB according to the time-frequency resource corresponding to the SSB with the same sequence number in the basic group and the time-domain offset indication information.

11. The method according to claim 7, wherein a time-frequency resource corresponding to a SSB in the extended group and a time-frequency resource corresponding to a SSB with a different sequence number in the basic group are the same in the time domain, and correspond to different carrier units in the frequency domain;

before the receiving the information block, the method further comprising:
monitoring a plurality of carrier units in the time domain corresponding to the SSB in the basic group.

12. The method according to claim 7, wherein the SSB in the extended group includes a mark identifying the extended group;

the determining whether the SSB belongs to a basic group or an extended group comprises:
determining whether the SSB belongs to the basic group or the extended group according to whether the SSB includes the mark.

13. A device for transmitting a synchronization signal, applied to a base station, comprising:

a processor; and
memory storing instructions executable by the processor;
wherein the processor is
configured to, upon execution of the instructions:
perform channel detection for a time-frequency resource corresponding to a synchronous broadcast block (SSB) in a basic group to be sent and a time-frequency resource corresponding to a SSB in an extended group to be sent respectively, to detect whether a time-frequency resource is idle, wherein each of the basic group and the extended group includes a SSB with a same sequence number; the SSB with the same sequence number in the basic group and the SSB with the same sequence number in the extended group correspond to different time-frequency resources; and
when a time-frequency resource corresponding to at least one SSB in the basic group and the extended group is idle, transmit an information block on the time-frequency resource, the information block including the at least one SSB.

14. The device according to claim 13, wherein the time-frequency resource corresponding to the SSB with the same sequence number in the basic group and the time-frequency resource corresponding to the SSB with the same sequence number in the extended group are not continuous in a time domain, and correspond to different carrier units in a frequency domain.

15. The device according to claim 13, wherein the time-frequency resource corresponding to the SSB in the extended group and the time-frequency resource corresponding to the SSB with a different sequence number in the basic group are the same in a time domain, and correspond to different carrier units in a frequency domain.

16. The device according to claim 13, wherein the information block further includes offset indication information used to indicate an offset of the time-frequency resource corresponding to the SSB with the same sequence number in the extended group relative to the time-frequency resource corresponding to the SSB with the same sequence number in the basic group.

17. The device according to claim 16, wherein the offset indication information includes time domain offset indication information, or includes time domain offset indication information and frequency domain offset indication information.

18. The device according to claim 13, wherein the SSB in the extended group includes a mark identifying the extended group.

19. A base station comprising the device according to claim 13, wherein the base station is configured to send the SSB with the same sequence number repeatedly, to facilitate user equipment (UE) with more chances to receive the SSB and thereby completing a synchronization process timely.

20. The base station according to claim 19, wherein the base station is further configured to transmit a plurality of SSBs with the same sequence number on different carrier units, to thereby facilitate a single-carrier UE operated on the different carrier units performing the synchronization process, and a multiple-carrier UE having more chances of receiving the SSB.

* * * * *